Sept. 20, 1971     T. J. HALEY     3,606,414
FASTENER
Filed Aug. 22, 1969
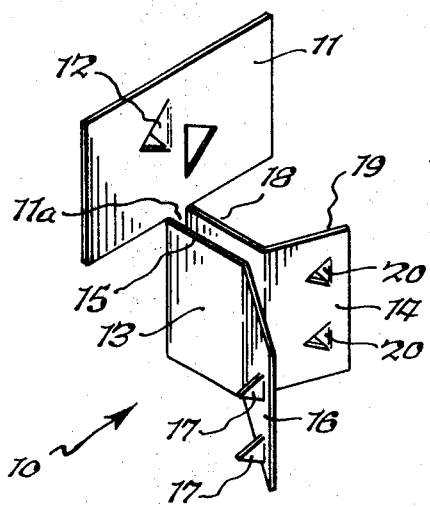
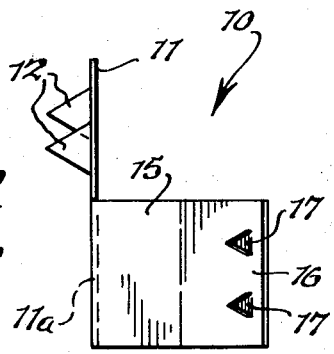
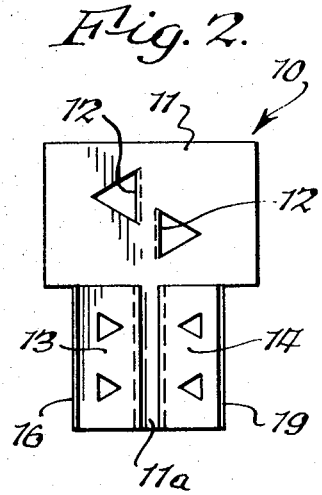
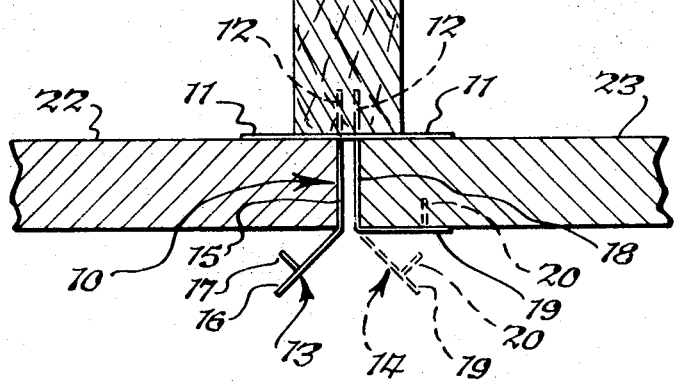
INVENTOR.
Thomas J. Haley
BY
Christel & Bean
ATTORNEYS.

United States Patent Office 3,606,414
Patented Sept. 20, 1971

3,606,414
FASTENER
Thomas J. Haley, Griffin, Ga., assignor to Osmose Wood
Preserving Co. of America, Inc., Buffalo, N.Y.
Filed Aug. 22, 1969, Ser. No. 852,352
Int. Cl. F16b
U.S. Cl. 287—189.35                          10 Claims

ABSTRACT OF THE DISCLOSURE

A fastener for securing to a first member, for example a stud, at one surface thereof a second and, if desired, also a third member, for example drywall panels, at the edge thereof. A uniplanar base member is mounted to the stud by cut-out anchor points driven therein. A leg member extending from the base overlays the edge of the panel when it is positioned against the stud, which leg is secured to the panel by cut-out anchor points driven therein.

BACKGROUND OF THE INVENTION

This invention relates to the fastener art and, more particularly, to a fastener for securing a first member at one surface thereof to a second member at the edge thereof.

An important area of use of the present invention is in the fastening of wallboard to a stud and more particularly in the fastening of drywall to relatively narrow wooden studs. A significant problem in fastening drywall to a relatively narrow wooden stud, for example a stud having a one inch edge, is the lack of sufficient bearing area for driving a nail through the drywall and into the stud. Although designated "one inch," the stud edge often is slightly smaller in its final finished form as available from the mill. In addition, a nail is undesirable as a fastener in such applications because it provides no bearing area against which the edge of the drywall can rest and because it often is inadequately secured to the drywall.

The problem of fastening drywall to wooden studs having such a relatively narrow edge has limited the use of wooden studs to those having relatively larger, for example, the two-inch edges. A fastener permitting use of one-inch studs would be highly advantageous just from the standpoint of the economies arising from the use of the relatively smaller studs. One-inch wood studs treated with fire retardant material can compete more significantly with the steel studs which currently are popular in the construction of non-load bearing partition assemblies. Moreover, future scarcities of wood may necessitate the use of studs of the smaller, one-inch edge variety in the construction of residential buildings in which studs of the larger, two-inch edge variety presently are used.

SUMMARY OF THE INVENTION

It is, therefore, an object of this invention to provide a fastener for securing, to one surface of a first member, for example a stud, a second member, for example a drywall panel, at the edge thereof.

It is a more particular object of this invention to provide such a fastener which is effective even when the surface of the first member is relatively small, for example about one-inch.

It is a further object of this invention to provide such a fastener which includes a bearing area against which the edge of the second member can rest and which is adequately secured to the second member.

It is a further object of this invention to provide such a fastener for securing to the first member at the same surface thereof a third member at the edge thereof and which is disposed in the same plane as the second member.

It is a more particular object of this invention to provide the foregoing in a fastener for securing, to a wooden stud at the relatively narrow edge surface thereof, drywall panels at the edge thereof.

The present invention provides a fastener having a uniplanar base member adapted to be mounted to a surface of a first member, for example the relatively narrow edge of a wooden stud, mounting being provided by anchoring means driven into the surface. The fastener further includes a leg member extending from the base member and overlaying the edge of a second member, for example a wallboard, in a manner providing a bearing area for the edge and enabling adequate securement to the fastener when the second member is positioned against the first member. A third member, for example another wall board, can be secured to the first member at the remaining portion of the surface and in a similar manner by another leg member extending from the base member of the fastener and overlaying the edge of the third member.

These and other advantages and characterizing features of the present invention will become clearly apparent upon a reading of the foregoing description together with the included drawing wherein;

BRIEF DESCRIPTION OF THE DRAWING FIGURES

FIG. 1 is a perspective view of a fastener provided by the present invention;

FIG. 2 is an elevational view of one end of the fastener shown in FIG. 1;

FIG. 3 is an elevational view thereof taken from a direction at right angles to that of FIG. 2; and FIG. 4 is a plan view of the fastener of FIG. 1 and showing the manner in which it is applied.

DETAILED DESCRIPTION OF THE ILLUSTRATED EMBODIMENT

The fastener provided by the present invention desirably can be stamped or otherwise formed from a single, relatively thin piece of metal. As shown in FIGS. 1–3, the fastener 10 includes a uniplanar base member 11 provided with anchoring means in the form of cut-out points or prongs 12 struck therefrom as seen more clearly in FIG. 3. The sharp anchor points 12 are relatively thin, being the same thickness as that of base member 11, and oriented relative to the grain of wooden studs to facilitate securement to relatively narrow, e.g. one inch wooden studs as will be described presently.

The fastener 10 also includes first and second leg members 13 and 14, respectively, extending from base member 11 in spaced-apart relation. In particular, leg members 13 and 14 project from a relatively narrow extension 11a of base member 11, and this configuration facilitates forming of fastener 10 from a single piece of metal. Leg member 13 includes a first portion 15 extending from base member 11 in a plane substantially perpendicular to the plane of base 11 and a second portion 16 extending from portion 15 in a plane inclined relative to the plane thereof. The second portion 16 is provided with anchoring means in the form of cut-out points or prongs 17 struck therefrom as seen most clearly in FIG. 1. Similarly, leg member 14 includes a first portion 18 extending from base member 11 in a plane substantially perpendicular to that of base 11 and substantially parallel to that of portion 15, and a second portion 19 extending from portion 18 in a plane inclined relative to the plane thereof. The second portion 19 is provided with anchoring means in the form of cutout points or prongs 20 struck therefrom as shown in FIG. 1.

FIG. 4 shows the manner in which fastener 10 is used in securing to a first member at one surface thereof, for example stud 21 at the relatively narrow edge thereof, second and third members each disposed in a plane parallel to the surface of the first member, for example wall boards 22 and 23. Base member 11 is mounted on stud 21 by means of the anchor points 12 which are driven therein. The points 12 are sharp, relatively thin and disposed so as to enter stud 21 "with the grain." In other words, points 12 lie in planes extending lengthwise of stud 21. Moreover, the close horizontal spacing and slight vertical displacement of anchor means 12 facilitate securement to a relatively thin surface, such as the one-inch edge of a wooden stud. As seen in FIG. 4, base member 11 is mounted on stud 21 so as to be disposed in a plane parallel to the longitudinal axis of the stud.

Each of the leg members 13 and 14 extending from base 11 is adapted to overlay the edge of corresponding wall board members 22 and 23, respectively, when they are positioned against stud 21 as shown in FIG. 4. In particular, leg member 13 is adopted to overlay the edge of drywall panel 22 in a manner such that in final or assembled position, portion 16 extends from portion 15 in a substantially perpendicular direction with anchor points 17 being driven into panel 22. Portions 15 and 16 being so disposed provide a bearing area for the edge of panel 22. In addition, base member 11 provides a bearing area for the rear surface of panel 22 and enhances that provided by leg member 13. The fact that leg member 13 overlays the edge of wall board 22 plus the provision of the anchoring means therein insures adequate securement of wallboard to fastener. Since fastener 10 is formed from a piece of relatively thin metal, bending of leg portion 16 from the position shown in FIG. 4 to one corresponding to the solid line position of portion 19 in the FIG. 4, in which it is perpendicular to leg portion 15 can be done easily during assembly.

Similarly, leg member 14 is adapted to overlay the edge of drywall panel 23 in a manner such that in final or assembled position, portion 19 extends from portion 18 in a substantially perpendicular direction with anchor points 20 being driven into the panel. This arrangement likewise provides a bearing area for panel 23 and adequate securement thereof the the fastener. While the assembly shown in FIG. 4 is most common, fastener 10 could be used to secure merely two members together, for example panel 22 to stud 21, in other applications without departing from the spirit and scope of this invention.

The initially outwardly diverging orientation of leg portions 16, 19 facilitates the placement of panels 22, 23 in position against base 11 and leg portions 15, 18. Once the panels are positioned, leg portions 16, 19 are easily bent about the hinge axes provided by the junctures between portions 15, 16 and 18, 19 into anchoring engagement against the panels, i.e. from the full line position of portion 16 to the full line position of portion 19 in FIG. 4, the original position of portion 19 being indicated in broken lines in FIG. 4.

A rigid securement of drywall panels 22, 23 to stud 21 is provided when the anchoring means 17 and 20 on leg members 13 and 14, respectively, are driven into the panels as illustrated in FIG. 4. On the other hand, the anchoring means 17, 20 can be omitted for such applications where a less rigid attachment of drywall to fastener is desired. In such applications, the leg members 13 and 14 would be bent over the edge of the dry wall panels, with portions 16 and 19 alone providing the attachment without the aid of anchoring means 17, 20.

The present invention thus accomplishes its intended objects. The uniplanar base member 11 provided with the closely-spared anchor points 12 permits securement to a relatively small surface, for example a stud having a one inch edge. The leg members 13 and 14 extending from the base so as to overlay the edges of two panel members, for example drywall, permit securement to a surface having a small bearing area. In addition, the leg members 13 and 14 provide a bearing area for these panels, enhanced by base 11, and the anchoring means therein insure adequate attachment to the fastener. Legs 13, 14 are yieldable, to accommodate slight misalignment, while providing a firm anchor.

What is claimed is:

1. A fastener for securing wallboard to a stud comprising:
    (a) a uniplanar base member adapted to be mounted on a stud by anchoring means driven into the stud so as to be disposed in a plane parallel to the longitudinal axis of the stud; said base member including a substantially coplanar extension extending away from an edge of the base member;
    (b) a leg member extending from said base member extension and adapted to overlay the edge of a wallboard panel positioned against the stud, said leg member including a first portion extending from said base member in a direction substantially perpendicular to said base and a second portion extending from said first portion at an angle thereto and in a direction away from said base; and
    (c) anchoring means on said second portion of said leg member and adapted to be secured to the wallboard.

2. The fastener as defined in claim 1 wherein said base member is provided with anchoring means adapted to be driven in the stud.

3. The fastener as defined in claim 1 further including a second leg member extending from said base member and adapted to overlay the edge of a second wallboard panel positioned against the stud.

4. The fastener as defined in claim 3 wherein said second leg member includes a first portion extending from said base member in a direction substantially perpendicular to said base and a second portion extending from said first portion at an angle thereto and in a direction away from said first leg member.

5. The fastener as defined in claim 4 wherein said second portion of said leg member includes anchoring means adapted to be secured to said second wallboard.

6. The fastener as defined in claim 2 wherein said anchoring means are cut from said base and extend perpendicular thereto.

7. A fastener for securing to a first member at one surface thereof second and third members each disposed in a plane parallel to the surface of said first member, said fastener comprising:
    (a) a uniplanar base member provided with anchoring means and adapted to be mounted to said surface of said first member with said anchoring means driven therein; said base member including a substantially coplanar extension extending away from an edge of said base member;
    (b) a first leg member adapted to overlay the edge of said second member when it is positioned against said first member and including a first portion extending from said base member extension in a direction substantially perpendicular to said base and a second portion extending from said first portion at an angle thereto and in a direction away from said base;
    (c) said second portion of said first leg member provided with anchoring means adapted to be driven in said second member;
    (d) a second leg member adapted to overlay the edge of said third member when it is positioned against said first member and including a first portion extending from said base member extension in a direction substantially perpendicular to said base and a second portion extending from said first portion at an angle thereto and in a direction away from said first leg member;

(e) said second portion of said second leg member provided with anchoring means adapted to be driven in said third member.

8. The fastener as defined in claim 7 wherein said first member comprises a wooden stud and said second and third members each comprise a drywall panel.

9. A fastener for securing wallboard to a stud comprising:
    (a) a uniplanar base member adapted to be mounted on a stud so as to be disposed in a plane parallel to the longitudinal axis of the stud; said base member including a substantially coplanar extension extending away from an edge of said base member;
    (b) anchoring means cut from said base and extending perpendicular thereto adapted to be driven in the stud, said anchoring means being spaced vertically and spaced horizontally;
    (c) a leg member extending from said base member extension and adapted to overlay the edge of a wallboard panel positioned against the stud.

10. A fastener for securing to a first member at one surface thereof second and third members each disposed in a plane parallel to the surface of said first member, said fastener comprising:
    (a) a uniplanar base member adapted to be mounted to said surface of said first member by anchoring means driven into said first member; said base member including a substantially coplanar extension extending away from an edge of said base member;
    (b) a first leg member adapted to overlay the edge of said second member when it is positioned against said first member and including a first portion extending from said base member extension in a direction substantially perpendicular to said base and a second portion extending from said first portion at an angle thereto and in a direction away from said base;
    (c) said second portion of said first leg member provided with anchoring means adapted to be driven in said second member;
    (d) a second leg member adapted to overlay the edge of said third member when it is positioned against said first member and including a first portion extending from said base member extension in a direction substantially perpendicular to said base and a second portion extending from said first portion at an angle thereto and in a direction away from said first leg member; and
    (e) said second portion of said second leg member provided with anchoring means adapted to be driven in said third member.

References Cited

UNITED STATES PATENTS

| | | | |
|---|---|---|---|
| 757,489 | 4/1904 | Nicholson | 52—489 |
| 1,920,919 | 8/1933 | Venzie | 287—20.92WUX |
| 1,974,819 | 9/1934 | Koerner | 52—489X |
| 2,041,773 | 5/1936 | Manske | 287—20.92WX |
| 3,020,602 | 2/1962 | Siering | 52—489X |

DAVID J. WILLIAMOWSKY, Primary Examiner

W. L. SHEDD, Assistant Examiner

U.S. Cl. X.R.

287—20.92W; 52—489